Feb. 17, 1970　　　　　A. L. SCOTT　　　　　3,495,494
THREADED PLASTIC MEMBER WITH A REINFORCED THREAD
Filed July 11, 1967　　　　　　　　　　　　　2 Sheets-Sheet 2
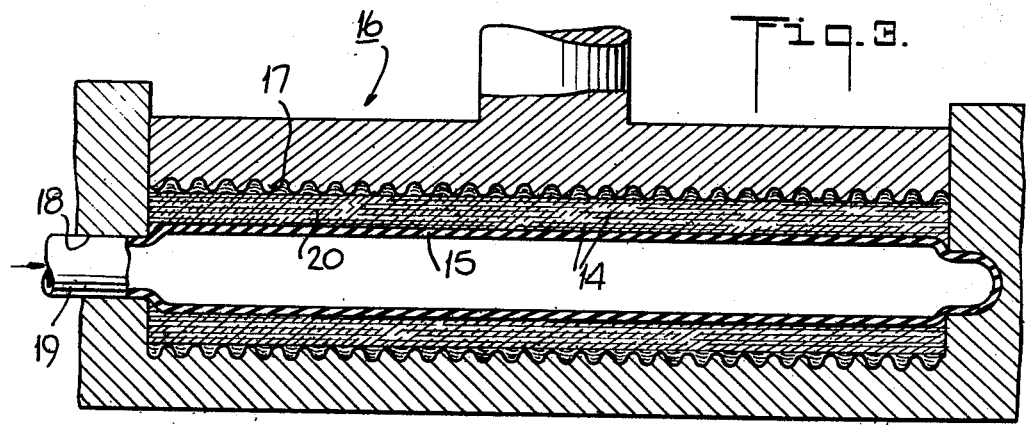
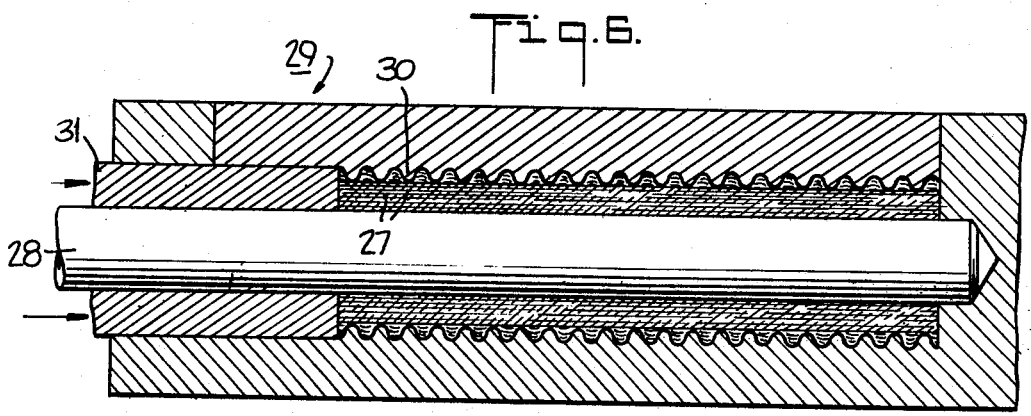
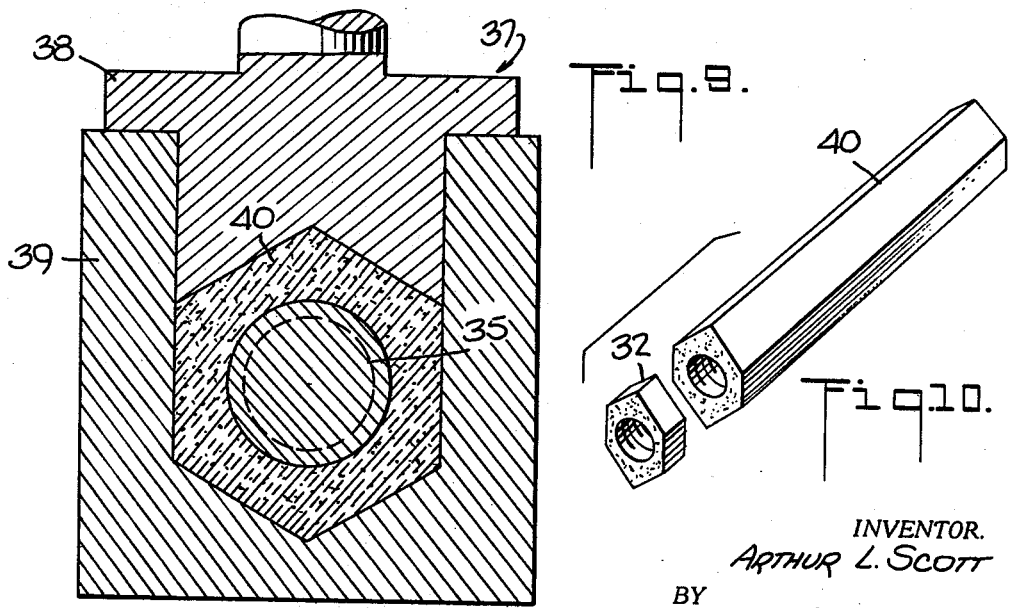
INVENTOR.
ARTHUR L. SCOTT
BY
Kenyon & Kenyon
ATTORNEYS United States Patent Office 3,495,494
Patented Feb. 17, 1970

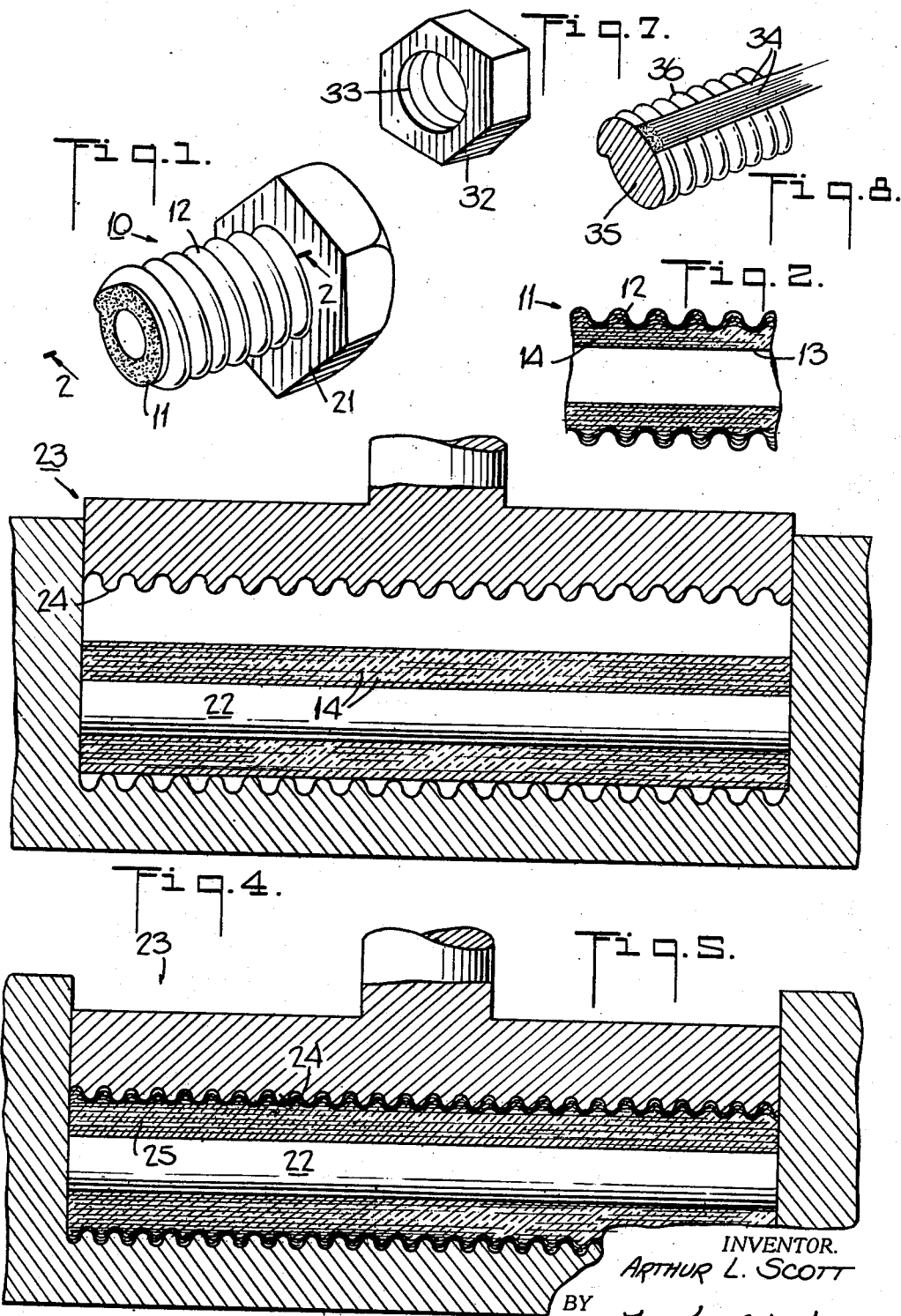

3,495,494
THREADED PLASTIC MEMBER WITH A REINFORCED THREAD
Arthur L. Scott, Richland, S.C., assignor to C/P Corporation, Newberry, S.C., a corporation of South Carolina
Filed July 11, 1967, Ser. No. 652,596
Int. Cl. F16b 27/00, 29/00, 35/00
U.S. Cl. 85—1                    13 Claims

ABSTRACT OF THE DISCLOSURE

Threaded plastic member such as bolts and nuts having threads with resin impregnated glass fiber filaments. The threads are rounded in cross section and the reinforcing filaments follow continuous serpentine paths through the threads, wherein each of the filaments throughout the cross-section of the threads extends longitudinally of the axis of the member.

---

This invention relates to reinforced threaded plastic members such as bolts and nuts, and more particularly to threaded plastic members which are reinforced with glass fibers, and to a method of making the same.

When one member is threaded into another complementarily threaded member, or when axial forces are exerted on a pair of already connected threaded members, the threads of the members are subjected to shear forces which may distort or otherwise damage the threads. To withstand such shear forces and reinforce the threads, threaded plastic members have heretofore been provided with threads comprised of resin impregnated glass fibers; however, such prior reinforcement has not been wholly satisfactory. In some cases glass fibers have been wound about the longitudinal axis of the members so that the glass fibers have run longitudinally of the threads. In other cases the glass fibers have been laid substantially perpendicular to the axis of the members so that the ends of the fibers have extended into the plane of the threads.

In those instances where the glass fiber reinforcement has been wound about the axis of the member and aligned longitudinally of the threads, the shearing forces imposed on the threads have been primarily opposed by the resin bonding the fibers. As a result, the shear strength of the threads has not been wholly satisfactory as the shear strength of resin is generally less than the shear strength of glass fiber, and the strength of the glass fiber has not been adequately utilized to reinforce the threads of the member.

In those instances where the glass fiber reinforcement has been laid substantially perpendicular to the axis of the threaded members, the ends of the glass fibers within the threads have been subjected to bending forces as well as forces in shear. Thus, in these instances, the glass fibers have not been utilized efficiently since the threads have been subject to failure under forces less than the shear strength of the glass fibers. Also, the method used to form such threaded members is time consuming and relatively expensive.

It is an object of this invention to provide a threaded plastic member having threads of increased shear strength as well as an efficient method of making the same.

It is another object of this invention to utilize the shear strength of glass fibers to reinforce threads on threaded plastic members.

It is a further object of this invention to reduce the amount of material needed in forming a threaded bolt or shaft having reinforced theads.

Briefly, this invention provides a threaded member such as a bolt or nut with an integral reinforced plastic thread as well as a method of making the same. The plastic thread of the member is reinforced by a plurality of resin impregnated glass fibers disposed longitudinally of the axis of the threaded member and extending in a serpentine manner through the threads so as to withstand the shear forces imposed on the threads. The glass fibers are closely spaced within the threads and are oriented in generally serpentine paths along their lengths so as to conform to the cross section of the threads. The glass fibers are thus oriented to act substantially in shear when a force, such as a threading force or an axial force, is imposed on the threads of threaded member. Because glass fibers have a relatively high shear strength, the threads of the members made in accordance with the invention are able to withstand higher forces than the threads of heretofore known threaded members.

In one of the embodiments of this invention described herein for preparing a bolt, the bolt is formed with an integral thread by laying of a plurality of resin-impregnated glass fiber rovings or filaments axially about a deformable tube such that the fibers of the rovings are substantially parallel to the tube. Thereafter, a mold having the form of a screw thread is placed around the glass fiber rovings and the tube, and the tube is then inflated under pressure to force the glass fiber rovings against the mold and into the configuration of a screw thread. The mold is then heated to cure the resin so as to form a threaded bolt. The tube is then deflated and the tube and mold removed.

In one of the embodiments of this invention described herein for preparing a nut, the nut is formed with an integral thread by laying a plurality of resin-impregnated glass fiber rovings or filaments axially about a threaded rod. Thereafter, the rod and glass fiber rovings or filamants are placed under pressure in a mold which is then heated to cure the resin. Thereafter, the mold is opened, the threaded rod is threaded from the molding and the molding is cut into the proper lengths to form a plurality of nuts.

These and other objects and advantages of the invention will become more apparent from the following detailed description and appended claims taken in conjunction with the accompanying drawings in which:

FIG. 1 illustrates a perspective view of a threaded bolt made according to the invention;

FIG. 2 illustrates a cross-sectional view taken on line 2—2 of FIG. 1;

FIG. 3 illustrates a cross-sectional view of a collapsible tube and a mold for forming a bolt as in FIG. 1;

FIG. 4 illustrates a cross-sectional view of a modified mold for forming a bolt of the invention prior to compressing of the glass fiber rovings;

FIG. 5 illustrates a cross-sectional view of the mold of FIG. 4 after compressing of the glass fiber rovings;

FIG. 6 illustrates a cross-sectional view of another modified mold for forming a bolt of the invention;

FIG. 7 illustrates a perspective view of a nut according to the invention;

FIG. 8 illustrates a perspective view of a threaded mandrel with a plurality of resin-impregnated glass fiber rovings disposed axially of the mandrel.

FIG. 9 illustrates a cross-sectional view of a mold for forming a nut as in FIG. 7; and FIG. 10 illustrates a perspective view of a molding formed in the mold of FIG. 9 and a nut cut from the molding.

Referring to FIG. 1, bolt 10 has a shank 11 which is formed with an external screw thread 12 having a rounded apex. For example, a screw thread designated as around 30° (I.S.A.) in World-Screw-Thread Forms-I published in American Machinist/Metalworking Manufacturing June 12, 1961 is used. Also, other similar threads can be used such as those designated as Whitworth, Special Whitworth, Round, Bottle Closure, Edison, etc., as in those thread forms numbered 61, 76, 79, 80, 83, 102 and 103, in the above publication. The screw thread 12 is continuous along the length of the bolt shank 11 and follows a helical path about the axis of the bolt 10.

Referring to FIGS. 1 and 2, the bolt shank 11 is formed with an internal hollow core 13 and comprises a plurality of resin impregnated glass fiber filaments 14 which are oriented generally longitudinally of the axis of the bolt 10. The filaments nearest the bore 13 are positioned in paths substantially parallel to the longitudinal axis of the bolt, while the filaments within and nearest the surface of the thread 12 are positioned in smooth serpentine or undulating paths.

Referirng to FIG. 3, the shank 11 is made by initially laying resin-impregnated glass fiber filaments 14 longitudinally about a collapsible tube 15, such as a hollow rubber tube. Thereafter, the tube 15 and surrounding filaments are placed within a mold cavity of a mold 16, such as a split or solid mold, having an internal wall 17 formed in the shape of a screw thread complementary to the screw thread 12 on the completed shank 11. Next, with the outermost filaments contacting the wall 17 so as to bridge the spaces between adjacent convolutions of the threaded configuration, the tube 15 is inflated as by hydraulic or pneumatic pressure to force the filaments outwardly into the thread configuration of the wall 17 while the mold 16 is simultaneously heated to a temperature to cure the resin within the mold cavity. In order to facilitate the inflation of the tube 15, one end of the tube 15 is closed while the other end is open and in communication with a passageway 18 through one end of the mold 16. This passageway 18 communicates directly with a conduit 19 for passing hydraulic fluid or air into the interior of the tube 15 under pressure. After a sufficient pressure has been developed to expand the tube 15 and force the outer filaments into the thread and after the resin has been cured to set the filaments in place, the pressure in the tube 15 is reduced to permit the tube to deflate or collapse and the tube is removed from the cured molding 20 of glass fiber filaments and resin. Next, the mold 16 is opened and the molding 20 is removed. The state of the molding 20 is such that the innermost filaments are maintained substantially in the initial straight parallel relation while the outermost filaments are oriented into paths complementary to the serpentine shape of the configuration of the wall 17 of the mold cavity. The filaments between the outermost and innermost filaments are disposed in smooth transitional paths intermediately between the configurations of the outermost and innermost filaments.

After being removed from the mold 16, the ends of the molding 20 are trimmed. A nut 21, formed in a manner as hereinafter described, is then screwed onto one end of the molding forming the shank 11 and cemented in place so as to form the head of the bolt 10. The molding 20 can also be cut into shorter lengths as desired.

Referring to FIGS. 4 and 5, the shank 11 can also be made by initially laying a bundle of resin impregnated glass fibers filaments 14 substantially uniformly about a steel or other mandrel 22 to form an assembly which is thereafter placed within a mold cavity of a split mold 23 and molded. As in the above instances, the internal wall 24 of the mold cavity is formed with a threaded configuration complementary to the thread 12 of the shank 11. The bundle of filaments are laid in parallel relation to the mandrel 22 until an overall diameter is formed which is at least equal to the pitch diameter of the screw thread. Thereafter, the mandrel 22 and overlying filaments are placed in the cavity of the mold 23 and the split portions of the mold 23 are brought together to exert a substantially circumferential compressive force on the resin impregnated filaments so that the outermost filaments assume the configuration of the wall 24 of the mold cavity and fill up the space between the convolutions in the wall 24. The compressive force is exerted on the filaments in a radially inward direction while heat is developed in the mold in a known manner in order to cure the resin within the mold cavity and thereby set the filaments in place. After curing and setting, the mold 23 is opened, the molding 25 is removed and the mandrel 22 is slid from within the molding 25. The molding 25 is then utilized in a manner as above to form one or more bolts 10.

Alternatively, a plurality of resin impregnated glass fiber filaments can be laid into the split mold 23 without the utilization of a mandrel so that the finished molding is of solid construction rather than hollow.

In order to reduce the effects of the flash formed during molding, the wall 24 of the mold 23 can be shaped so as to define a pair of opposite flat side walls parallel to or slightly divergent to each other at the flash line. A molding which is thus formed has a pair of oppositely disposed flats between a pair of threaded arcuate portions so that the thread form is flattened out at each parting line of the mold making the cross-section of the molding conform to what is sometimes referred to as a double-D shape.

Instead of using the compressive force of a mold, after the resin impregnated filaments are positioned about the mandrel 22 and the mold 23 is closed, the mold 23 is alternately spun rapidly so that the filaments are forced radially outwardly under the centrifugal force created to fill the space between the convolutions and to conform to the contour of the wall 24. The molding which is formed in this manner is subsequently utilized as above to form a bolt 10.

Referring to FIG. 6, the shank 11 can be made in still another manner. For example, with a plurality of resin impregnated glass fiber filaments 27 laid up in a bundle at least substantially equal to the minor diameter of the finished thread and disposed in parallel relation circumferentially about a mandrel 28 positioned within a mold cavity of a mold 29 having an internal wall 30 of threaded configuration as above, an annular plug 31 which is slidably mounted on one end of the mandrel 28 within one end of the mold 29 is forced against the filaments. The plug 31 is forced into the mold cavity under a sufficient force such that the filaments tend to buckle. Plug 31 thereby influences the filaments to fill up the spaces between the convolutions of the wall 30 and form the desired thread configuration. The mold is also heated at the same time to cure the resin and to set the filaments in place. After curing, the plug 31 and mandrel 28 are pulled from the mold cavity, the mold 29 opened and the completed molding is removed and utilized as above to form a bolt 10.

The plastic bolts 10 which are formed in these above manners have threads which are able to withstand considerable shearing forces since the filaments in the threads are oriented in planes substantially perpendicular to the plane of the shearing forces. Thus, in order for a shearing force to shear a portion of the thread from the bolt, a force approximately equal to the shear strength of the filaments must be developed rather than a lesser force equal to the shear strength of the resin.

In FIG. 7, a nut 32 is illustrated which has an internal screw thread 33 having a rounded configuration similar to the external screw threads on the above described bolt. Nut 32 is formed of any known external shape such as a hexagonal shape and the thread is formed integrally with the remainder of the nut.

Referring to FIGS. 8 and 9, in order to form a nut, as above, a plurality of resin impregnated glass fiber filaments 34 are laid in parallel relation about a steel or other mandrel 35 having an external thread 36 shaped complementarily to the thread 33 of nut 32. The assembly of filaments 34 and mandrel 35 is then placed centrally within a mold cavity of a split mold 37 as by setting the mandrel ends in suitable sockets (not shown). The walls of the mold cavity are smooth and are shaped to impart the desired external polygonal shape to the finished glass fiber molding. Thereafter, the male portion 38 of mold 37 is forced into the female portion 39 of the mold to exert a compressive force which drives the filaments nearest the mandrel 35 into the spaces between the thread 36 so as to assume the contour of the thread 36 and form the complementary thread 33. At the same time, the mold 37 is heated to cure the resin and set the filaments in place. After curing, the mold is opened and the molding 40 is removed. The mandrel 35 is then unscrewed from the molding 40 and, referring to FIG. 10, the molding 40 is then cut as desired into individual nuts 32.

Alternatively, the nut 32 can be formed by initially applying a layer of axially oriented resin impregnated filaments on the threaded mandrel 35 to a thickness of about twice the thread depth. Thereafter, the remaining filaments are helically wound about the axial filaments and mandrel 35. This assembly is then handled in the manner as above to form a molding of integrally bonded glass fiber filaments having a continuous helically disposed internal thread thereon in which the filaments are disposed longitudinally of the molding.

The plastic nuts 32 which are formed in the above manner have threads, similar to the above bolts, which have reinforcing glass fiber filaments extending longitudinally of the axis of the nuts and substantially transversely of the threads. Thus, the threads are able to withstand shearing forces equal to the shear strength of the filaments rather than forces equal to the lesser shear strength of the resin bonding the filaments together.

As is apparent from the foregoing, the invention provides a threaded member with integral threads which are reinforced against shear by glass fiber filaments which are efficiently disposed to counteract shearing forces. In those cases where a shearing plane extends through a thread from one side to the other, the shearing force is opposed by two cross-sectional areas of each filament in the shearing plane. Thus, the filaments in these threads are able to counteract a shearing force substantially equal to twice the shear strength of the filaments.

The invention further provides simplified methods of forming the nuts and bolts wherein the several steps of the method can be performed in an easily controlled manner simply and quickly at a reasonable cost. Also, in the case of the bolts, since such can be formed with hollow cores, a substantial reduction in material is achieved.

Having thus described particular embodiments of the invention, it is not intended that it be so limited as changes may be made therein without departing from the spirit and scope of the invention. Accordingly, it is intended that the foregoing Abstract of the Disclosure, and the subject matter described above and shown in the drawings be interpreted as illustrative and not in a limiting sense.

What is claimed is:

1. A threaded member having an integral thread having a rounded apex on a surface thereof, said thread consisting of a plurality of resin impregnated glass fiber reinforcing filaments disposed in a serpentine manner with each of said filaments throughout the cross-section of said thread extending longitudinally of the axis of said member and extending within said thread, at least some of said filaments being oriented in planes substantially perpendicular to the plane of the shearing forces acting on said thread.

2. A threaded member as set forth in claim 1 wherein said thread is disposed on the exterior surface of said member.

3. A threaded member as set forth in claim 1 wherein said member is hollow and said thread is disposed on an interior surface of said member.

4. A threaded member as set forth in claim 1 wherein said thread is continuous and disposed helically of the longitudinal axis of said member.

5. A threaded member as set forth in claim 1 wherein said reinforcing filaments are closely spaced within said thread to conform to the cross-section of said thread.

6. A threaded member as set forth in claim 1 wherein said filaments are disposed near the outer surface of said thread.

7. A bolt comprising a shank and an integral thread having a rounded apex on the exterior surface of said shank, said thread consisting of a plurality of resin impregnated glass fiber reinforcing filaments disposed therein in a serpentine manner with each of said filaments throughout the cross-section of said thread extending longitudinally of the axis of said shank and extending within said thread, at least some of said filaments being oriented in planes substantially perpendicular to the plane of the shearing forces acting on said thread.

8. A bolt as set forth in claim 7 wherein each of said filaments is sized to extend along the length of said shank.

9. A bolt as set forth in claim 7 wherein said shank is comprised of resin impregnated glass fiber filaments.

10. A bolt as set forth in claim 7 which further comprises a head on one end of said shank, said head having an internal surface and a thread integrally formed on said surface complementary to and in mating contact with said thread on said shank.

11. A nut comprising a hollow member having an interior surface and an integral thread having a rounded apex on said surface, said thread consisting of a plurality of resin impregnated glass fiber reinforcing filaments disposed therein in a serpentine manner with each of said filaments throughout the cross-section of said thread extending longitudinally of the axis of said member and extending within said thread, at least some of said filaments being oriented in planes substantially perpendcular to the plane of the shearing forces acting on said thread.

12. A nut as set forth in claim 11 wherein the outermost filaments in said member are disposed helically of the axis of said member.

13. A nut as set forth in claim 11 wherein said thread is disposed helically on said interior surface.

References Cited

UNITED STATES PATENTS

| | | | |
|---|---|---|---|
| 2,751,237 | 6/1956 | Conley | 285—284 |
| 2,810,139 | 10/1957 | Plagemann | 85—9 |
| 2,897,840 | 8/1959 | Roberts et al. | 264—258 |
| 2,943,967 | 7/1960 | Simon | 85—46 |
| 3,381,715 | 5/1968 | Michael | 285—423 |

RAMON S. BRITTS, Primary Examiner

U.S. Cl. X.R.

10—27; 85—46; 138—174; 264—257